Oct. 21, 1958  W. R. GRISWOLD  2,857,034
INDEXING OF OBJECTS
Filed Feb. 27, 1956  2 Sheets-Sheet 1
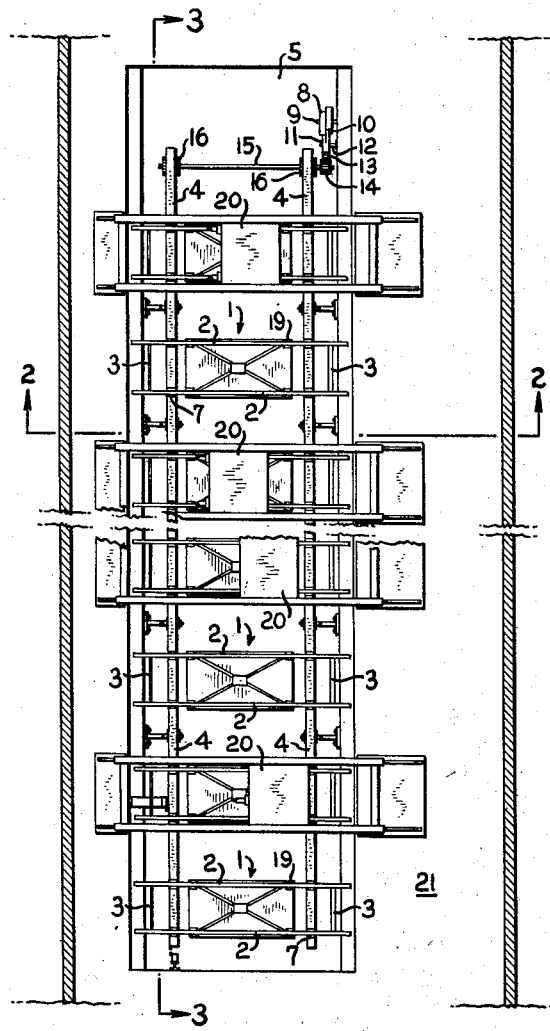

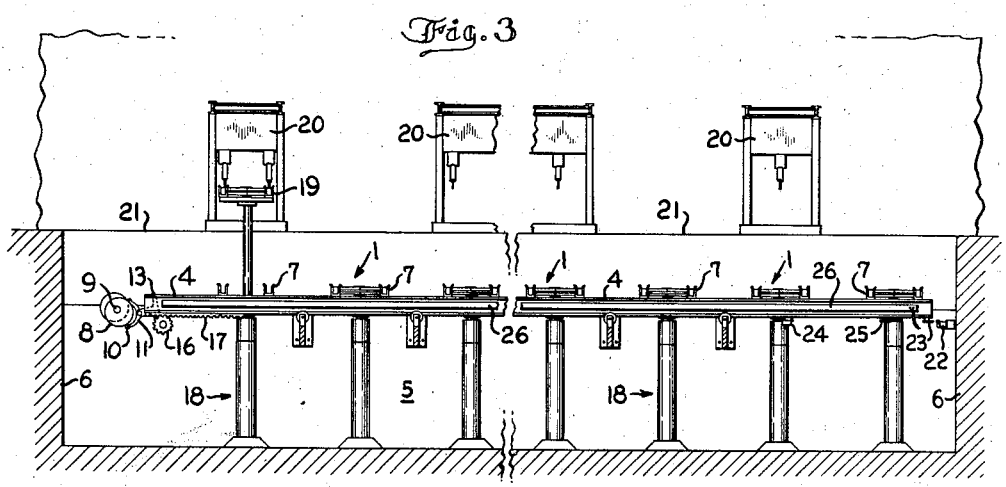
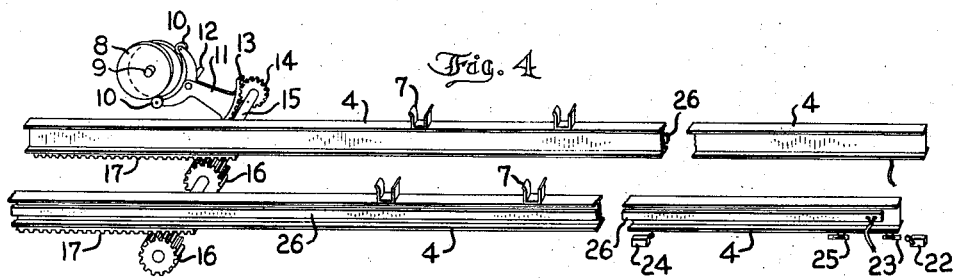
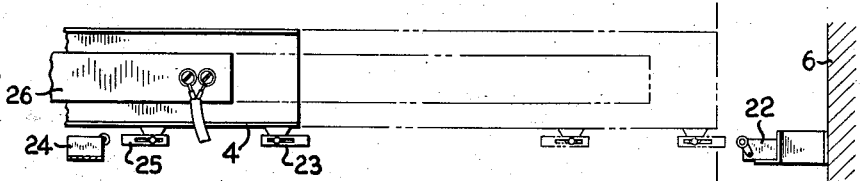
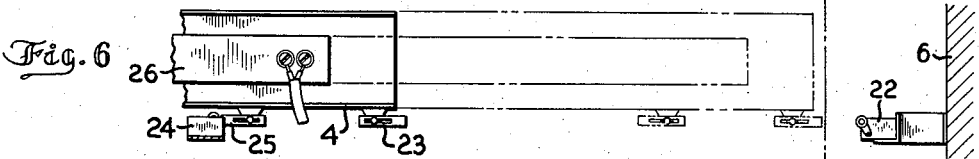
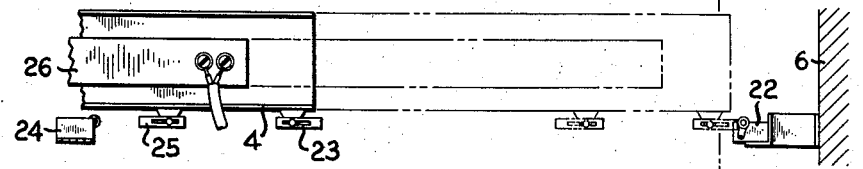

United States Patent Office 2,857,034
Patented Oct. 21, 1958

2,857,034

INDEXING OF OBJECTS

Walter R. Griswold, Chicago, Ill., assignor to A. O. Smith Corporation, Milwaukee, Wis., a corporation of New York Application February 27, 1956, Serial No. 567,986

9 Claims. (Cl. 198—19)

This invention relates to indexing of objects, and more particularly to indexing of two or more members so that their dimensions are maintained in a given relationship or ratio.

The invention is particularly applicable where a primary member and a secondary member are subject to changes in dimensions due to external or internal temperature variations or the like. In some instances, as where a primary member and secondary member are co-acting together under conditions of relatively rigid tolerance limitations, it is imperative that the dimensions of the secondary member are kept commensurate relative to the dimensions of the primary member at all times and through all dimensional changes of the primary member.

The present invention is based upon the discovery that the dimensions of the secondary member may be made to correspond relatively to those of the primary member by means of a sensing device secured to the primary member and adapted to contact the secondary member at intervals, the frequency and time of contact serving to actuate a heating means which effects expansion or contraction of one of the members to maintain the proper dimensional relationship. The invention is applicable regardless of the relative sizes of the two members, and even when the members are of identical dimensions but are affected by different ambient temperatures.

The invention may be applied in a manufacturing plant utilizing long metal reciprocating rails which are used to transfer articles of manufacture from one station to another. These articles are placed on and removed from the rails by lifting or other mechanism which is secured to the floor of the plant. In order to provide proper registry of this mechanism with the articles which are held in place on the rails by spaced pins or the like, the spacing between the lifting mechanism and the articles must be kept constant.

The lifting mechanism is attached to the plant floor or foundation which expands and contracts slightly at various times, due to climatic changes which effect the ground on which the floor is supported. Changes in the floor foundation cause a slight shifting of the lifting mechanism. However, since the temperature of the interior of the plant is not relatively commensurate with the external temperature and may undergo different fluctuations, the transfer rails will not correspondingly expand and contract, thus preventing proper registry of the lifting mechanism with the articles or preventing proper registry of the articles with the rails and pins.

The invention provides a means to regulate the dimensions of the transfer rails so that they are properly indexed in relation to the lifting mechanism, regardless of the ambient temperatures tending to expand and/or contract both the rails and the lifting mechanism.

The accompanying drawings illustrate the best mode presently contemplated by the inventor for carrying out the invention.

In the drawings:

Figure 1 is a top plan view of the interior of a vehicle frame manufacturing plant showing the transfer mechanism and work stations;

Fig. 2 is a transverse section through the plant, taken on line 2—2 of Fig. 1 and showing a frame raised into position adjacent a welding or other type machine;

Fig. 3 is a side elevation of the interior of the plant taken from the left of Fig. 1;

Fig. 4 is a diagrammatic view of the transfer rails and drive mechanism therefor;

Fig. 5 is an enlarged side elevation of the forward portion of the transfer rails, showing the rails in their initial position in full lines and in their extended position in dash lines, when the relative dimensional ratio is at the desired constant;

Fig. 6 is a view similar to Fig. 5 when the relative dimensional ratio has been reduced to the lower tolerance limit;

Fig. 7 is a view similar to Fig. 5 when the relative dimensional ratio has been increased to the upper tolerance limit; and Fig. 8 is a showing of a circuit for the system.

The drawings show a portion of a plant for manufacturing and assembling vehicle frames 1. Each frame generally comprises a pair of spaced parallel side rails 2 joined by suitable cross members 3. The frames are adapted to be supported and transferred from work station to work station within the plant by a pair of spaced parallel transfer beams or rails 4.

Rails 4 are disposed within a long trench 5 formed in the foundation 6 of the plant, and are provided with a plurality of generally U-shaped forks 7 which receive the side rails of frames 1 and position the frames with respect to rails 4.

Transfer of frames 1 is accomplished by a controlled reciprocating stroke of rails 4 within trench 5. The rail reciprocating means comprises generally a pair of cams 8 which are secured to a cam shaft 9. The cam shaft 9 is driven by a suitable motor and speed reducing mechanism, not shown.

A pair of cam followers 10 are rotatably secured to a rocker arm 11 and each of the followers 10 is adapted to engage and ride on the surface of one of the cams 8. Rocker arm 11 is fulcrumed to a pin 12 and carries a gear quadrant 13 which meshes with a gear 14 keyed to a drive shaft 15. With this construction, rocker arm 11 pivots as the followers 10 ride on cams 8 to thereby rotate gear 14 and drive shaft 15.

Drive shaft 15 extends transversely across trench 5 beneath rails 4 and has a pair of driving gears 16 adapted to mesh with gear racks 17 disposed on the underside of rails 4. Rotation of shaft 15 is thus imparted through driving gears 16 and racks 17 to move rails 4 in reciprocating straight line motion within the trench 5.

A plurality of lifting units, indicated generally at 18 are disposed in the trench and connected to the bottom thereof. Lifting units 18 are adapted to move vertically between rails 4 and engage frames 1 and raise them out of contact with rails 4 above the floor level of foundation 6 to a series of work stations where specific operations in the assembly of the frame is performed. Each unit 18 is shown as hydraulic in nature and has a plurality of forks 19 thereon which are adapted to engage the frames to be lifted.

A plurality of machines 20 such as welders, riveters or the like, are mounted on the floor 21 of the plant adjacent at least some of the work stations. Machines 20 may be provided with suitable clamps which are adapted to receive the frames 1 which are lifted out of trench 5 by lifting units 18.

During manufacture of the frames, each frame 1 is initially placed on rails 4 in registry with forks 7. Rails 4 are then moved a given distance to the right, as shown in Figs. 5–7. When the end of the stroke is reached, lifter units 18 are actuated to lift frames 1 upwardly from rails 4 and into engagement with machines 20 which perform their various functions on the frames. As soon as frames 1 are lifted out of engagement with rails 4, the rails are returned to their initial position. After machines 20 have completed work on their respective frames, lifter units 18 lower the frames down onto forks 7, and the cycle begins again. This time, however, each frame is advanced to the next succeeding work station where a different manual or machine step in the manufacturing process is performed.

A more detailed disclosure of the structure and operation of the mechanism described above is contained in copending application Serial No. 533,759, filed September 12, 1955, by Donald E. Sherman, entitled, "Method and Apparatus for Automatically Fabricating Vehicle Frames," and assigned to a common assignee herewith.

During assembly of frames 1, it is essential that the forks 19 on lifter units 18 move vertically within the transverse plane passing through the corresponding forks 7 on rails 4 so that the side rails of the frame resting in forks 7 will be engaged by forks 19 and lifted from the rails and subsequently lowered down into the forks 7. Similarly, machines 20 must be in exact alignment with frames 1 so that welds, rivets, etc. are placed in the proper location. If proper registry does not occur, the frames will not be lifted to the work station, and parts of the machinery and frames may be damaged or bent. Since the transfer rails may be several hundred feet long, and since there may be a large number of work stations operating in conjunction with the rails, any shut down of the line will have a highly adverse effect on the manufacturing operations in terms of time wasted, repair costs, etc.

In a plant such as that described above, the air temperature within the building will very rarely equal the air temperature outside. Assuming that the air temperature within the plant would be fairly constant throughout the year, the temperature and length of the transfer rails 4 would also remain fairly constant. However, since the outdoor air temperature is apt to vary widely during a year, the building housing the machinery will shift slightly due to expansion and contraction of the ground and the foundation supported thereon. This expansion and contraction shifts the machinery secured to the foundation 6, such as the lifting units 18, and since there is not a corresponding shift of the comparatively free-floating rails 4, registry of frames 1 with forks 7 and 19 and machines 20 is apt to be hampered. Actually, the air temperature within the plant may often vary drastically, sometimes within short periods of time. In this situation, the rails 4 will therefore not remain at a constant length, but will expand and contract a substantial amount, thereby often aggravating the problems caused by shifting of the foundation.

The invention overcomes this problem and insures unhampered operation of the mechanism at all times, regardless of the temperature differential between the outside and inside of the plant. The dimensions of the rails 4, or secondary members, are made to correspond relatively to those of the foundation 6, or primary member, so that the shifting of the lifting units 18 and machines 20 is accompanied by a corresponding change in dimensions of rails 4. The forces tending to expand or contract rails 4 to prevent registry are also counteracted.

For the purpose of the invention, the location of drive shaft 15 and gears 16 thereon which mesh with racks 17 to drive rails 4 may be considered as fixed.

As shown in the drawings, the desired results may be accomplished by a limit switch 22 having a suitable contact thereon and disposed outwardly of the outer end of one of the rails 4 when the rails are in their initial position (i. e., at the extreme left in Figs. 5–7). Limit switch 22 is rigidly connected to the foundation 6 and is adapted to be engaged by an actuating member or contact 23 connected to the underside of the outer end portion of the corresponding rail 4. A second limit switch 24 having a suitable contact thereon is disposed adjacent the same rail 4 and in a direction inwardly from the outer end thereof.

Limit switch 24 is also rigidly connected to foundation 6. A second actuating member or contact 25 is connected to the underside of the same rail 4 adjacent its outer end, and is adapted to engage limit switch 24 in a manner to be described.

Spacing of the respective actuating members and limit switches is tied to the length of rail stroke and the tolerance limits required. A tolerance limit of 1/16", for example, will require a relative shift of 1/16" between an actuating member and its respective limit switch before contact is made when rails 4 reach the limits of reciprocating travel.

Limit switches 22 and 24 are employed to measure the relative change in length between the foundation and the rails from the location of shaft 15 to the corresponding actuating members 23 and 25 when the rails are at the corresponding opposite ends of their reciprocation strokes.

A heating strip 26 is disposed along substantially the entire length of each rail 4, and is secured in heat conductive relation thereto by any suitable means. Each strip 26 may comprise a substantially flat elongated metal member, as shown in Fig. 4 of the drawing, or the heating means may be in coil or other form. Strip 26 is a resistance element which is connected in circuit with switches 22 and 24 and a 440 volt or other suitable source of power, and the circuit is closed or opened by actuation of switches 22 and 24, respectively.

During operation of the manufacturing plant, it will be assumed that the ambient temperature to which rails 4 are subjected will never be more than 100° F. The mechanism should then be set so that the ambient temperature at which the rails are in the proper position relative to the foundation is higher than the maximum plant temperature. This might be 120° F. Rails 4 should, at 120°, be exactly indexed so that proper registry of the frames will occur.

Engagement of limit switch 22 by actuating member 23 will open the circuit and cut off the current flowing through strip 26, thereby lowering the temperature of the strip 26 and rails 4 and shortening the latter. Engagement of limit switch 24 by actuating member 25 will close the circuit and start the current flowing through strips 26, thereby raising the temperature of the strips 26 and rails 4 and lengthening the latter.

Assuming that rails 4 are such that exact registry is obtained by frames 1 with forks 7 and 19 and the elements of machines 20, no contact will be made between limit switch 22 and member 23 when rails 4 are in their extreme extended position (i. e. to the far right in Fig. 5). Neither will contact be made between limit switch 24 and member 25 when rails 4 are in their initial position.

Fig. 8 shows a suitable circuit for the invention, and utilizes a relay 27, the latter controlling a power contact 28 and a latching contact 29.

Operation of the indexing means is as follows:

Assume that at the beginning of operations, strips 26 are not heating and that rails 4 are at the temperature for proper registry, 120° F. in the example. Relay 27 is de-energized, and contacts 28 and 29 are open. Upon beginning operations, rails 4 will tend to contract, since the plant temperature is lower and never exceeds 100° F. This will cause member 25 to shift rearwardly toward limit switch 24. At the same time, foundation 6 may be expanding due to outside temperature changes. Expansion of foundation 6 will cause limit switch 24 to shift forwardly toward member 25. This relative approach of switch 24 and member 25 may be due to contraction of rails 4, expansion of foundation 6 or a combination of both. When the relative approach reaches the tolerance limit beyond which registry of frames 1 with the mechanism is hampered or prevented, engagement of switch 24 by member 25 (shown in Fig. 6) will occur when rails 4 have reciprocated back to their initial position and will close the heating circuit to energize relay 27 and pull in contacts 28 and 29. This will heat rails 4 and cause them to expand and bring them back to a length so that the proper relative rail-to-foundation dimension ratio is re-established.

If foundation 6 has expanded, the proper registry temperature will no longer be 120°, due to the fact that rails 4 will no longer need to reach their initial length before the proper relative dimensional ratio is re-established.

During this time of relative unbalance, switch 22 will not be contacted by member 23 when rails 4 are in their extreme forward position because switch 22 and member 23 have drawn away from each other, relatively.

Strips 26 will maintain their heating action, regardless of subsequent reciprocating strokes of rails 4 and regardless of further contact between switch 24 and member 25, due to latching contact 29. Reduction or stopping of the heating action will occur in a manner described below.

Continued heating of rails 4 will eventually cause them to expand until the tolerance limit is reached. Expansion of rails 4 will move member 23 forwardly toward limit switch 22. At the same time, it may happen that foundation 6 is contracting due to outdoor temperature fluctuations. This will cause switch 22 to shift toward member 23. This shifting may be due to either expansion of rails 4, contraction of foundation 6 or a combination of both. When the relative approach reaches the tolerance limit beyond which registry of frames 1 with the mechanism is hampered or prevented, member 23 will engage switch 22 when rails 4 have reciprocated forwardly to their extreme extended position and will open switch 22 to prevent current from flowing through the circuit and will de-energize strips 26. This will lower the temperature of rails 4 and cause them to contract so that the proper relative rail-to-foundation ratio will be re-established. Relay 27 will be de-energized, thereby opening contacts 28 and 29.

Here, again, the proper registry temperature may no longer be 120°, especially if the foundation has also shifted.

During this time of relative unbalance, member 25 will not engage switch 24 when rails 4 are in their initial or extreme rearward position because member 25 and switch 24 will have drawn away from each other, relatively.

Heating strips 26 will remain de-energized until rails 4 have contracted and/or foundation 6 has expanded such that the tolerance limit is again reached, at which time switch 24 will be actuated by member 25 to again heat the rails.

It may happen that rails 4 and foundation 6 will expand or contract at the same time. This type of movement will tend to keep the relative dimensional relationship at the proper ratio. However, the rails may expand or contract at a different rate than the foundation, due to different temperature variations within or outside the plant, or such different rate may be due to different coefficients of expansion of the rails and the foundation. For example, the linear coefficient of expansion of ordinary steel is about $11 \times 10^{-6}/°$ C. while the C. O. E. of concrete is about $12 \times 10^{-6}/°$ C. A different rate of shifting, although in the same direction, will eventually cause a sufficient change in dimensional ratios so that the tolerance limit for proper registry of frames 1 is reached. When this occurs, the proper limit switch will be engaged to raise or lower the rail temperature so that the rail dimensions will return to the proper level.

It may be desirable in some instances to provide different levels of heating of strips 26. For example, a complete cut-off of strips 26 to contract rails 4 may not be necessary at all times. Switch controls or other means, not shown, may be provided so that the amount of current passing through strips 26 may be varied as desired.

At some time it may happen that the rails and foundation are at their proper relative dimensions, and subsequently the foundation contracts but the rails remain at the same length. If the floor contraction is sufficient to reach the tolerance limitation, member 23 will engage limit switch 22 when rails 4 have moved to their extreme forward position and will reduce the resistance heating current flowing through strips 26. Since the initial temperature of rails 4 which is necessary for proper registry is above the maximum ambient temperature of the plant, rails 4 will contract even though there has been no change in the plant ambient temperature.

Rails 4 will usually be subject to more extreme and rapid ambient temperature changes than foundation 6. The changes effecting the foundation may be quite slow and substantially cyclic in nature, closely following annual temperature curves for the ground surface and points therebeneath. The foundation will also be effected by heat loss therethrough from the inside of the plant.

Although only one set of limit switches and actuating members are shown as effecting the heating for both rails, a separate set could be used for each rail with each set effecting the heating of its corresponding strip 26.

The invention provides a novel automatic means for keeping at least two members at a substantially constant relative dimensional relationship, within set tolerance limitations. Although forces, such as temperature, may cause relative expansion and contraction of the members to such a degree that the tolerance limit is reached, the invention counteracts those forces and prevents exceeding the tolerance limits.

An increase in the relative dimensional ratio of the members to a point where the upper tolerance limit is reached will bring the mechanism of the invention into play to reduce the ratio so that it approaches the desired constant. Likewise, a decrease in the relative dimensional ratio of the members to a point where the lower tolerance limit is reached will bring the mechanism of the invention into play to increase the ratio so that it approaches the desired constant.

Although the large member has been designated as the primary member and the smaller member designated as the secondary member, the designations could be reversed or changed without departing from the spirit of the invention.

Various modes of carrying out the invention are contemplated as being within the scope of the following claims particularly pointing out and distinctly claiming the subject matter which is regarded as the invention.

I claim:

1. In combination with a primary member and a secondary member with each member being subject to dimensional variations caused by expansion and contraction of the members due to temperature changes, two sets of corresponding contact means secured to each of the members, the contact means of each set being disposed to engage each other in response to a discrepancy in a corresponding direction between the relative dimensional variations of the members occurs, and separate means connected to each of said members and actuated by engagement of the corresponding set of contact means to change the temperature of at least one of said members and maintain a substantially constant relative dimensional relationship between the primary and secondary members.

2. An apparatus for maintaining a substantially constant dimensional relationship between a primary member and a secondary member with each member being subjected to different environmental temperature changes, comprising, means secured to at least one of the members for sensing a discrepancy in either direction between the relative dimensions of the members, and means actuated by said sensing means to effect a corresponding temperature change in either one of the members to reduce said discrepancy and to restore the relative dimensional relationship of said members to a substantially constant value.

3. An apparatus for indexing a primary member and a secondary member to maintain a substantially constant relative dimensional relationship between the members with each member being subjected to different environmental temperature changes, comprising, a first pair of contacts secured to each of the members with one contact in the pair being secured to one of the members and the other contact in the pair being secured to the other member and with the contacts disposed to engage each other with an increase in the relative dimensional ratio over the desired constant, a second pair of contacts secured to each of the members with one contact in the pair being secured to one of the members and the other contact in the pair being secured to the other member and with the second contacts disposed to engage each other with a decrease in the relative dimensional ratio below the desired constant, and means actuated by engagement of one of said pairs of contacts to vary the relative temperatures of said members to restore the relative dimensional relationship of said members to substantially the desired constant.

4. An apparatus for indexing a relatively stationary primary member and a reciprocating secondary member to maintain a substantially constant relative dimensional relationship between the members with each member being subjected to different environmental temperature changes, comprising, a first pair of contacts secured to each of the members with one contact in the pair being secured to one of the members and the other contact in the pair being secured to the other member and with the contacts disposed to be engaged when said secondary member has reached one end of its reciprocating stroke and when an increase in the relative dimensional ratio to the upper tolerance limit has occurred, a second pair of contacts secured to each of the members with one contact in the pair being secured to one of the members and the other contact in the pair being secured to the other member and with the contacts disposed to be engaged when said secondary member has reached the other end of its reciprocating stroke and when a decrease in the relative dimensional ratio to the lower tolerance limit has occurred, and heating means secured to said secondary member and actuated by engagement of one of said pairs of contacts, said heating means changing the temperature of said secondary member to thereby effect a dimensional change of said secondary member so that the relative dimensional relationship between said members is restored to substantially the desired constant.

5. An apparatus for indexing a primary member and a secondary member to maintain a substantially constant relative dimensional relationship within set tolerance limits between the members with each member being subjected to different environmental temperature changes, comprising, a first limit switch secured to the primary member, a first contact secured to the secondary member and disposed to engage said limit switch when temperature changes have reduced the relative dimensional ratio to the lower tolerance limit, means actuated by said engagement to raise the relative dimensional ratio, a second limit switch secured to said primary member, a second contact secured to said secondary member and disposed to engage said limit switch when temperature changes have increased the relative dimensional ratio to the upper tolerance limit, and means actuated by said last-named engagement to lower the relative dimensional ratio between the primary and secondary member.

6. In a manufacturing plant having a foundation which supports a plurality of article handling elements, means to keep the dimensions of said foundation and said elements at a substantially constant ratio within set tolerance limits to facilitate handling therefor said means comprising, means for sensing a relative dimensional shift between said foundation and said elements at the tolerance limits, and means actuated by said sensing means to shift said elements to prevent the ratio from exceeding the tolerance limits and restore the relative dimensional relationship to substantially the desired constant.

7. In a plant for manufacturing articles, a foundation for said plant with the foundation being subject to shifting expansion and contraction forces generated by outdoor temperature changes and heat flow through the foundation, a plurality of spaced articles handling units secured to said foundation and shiftable therewith, at least one reciprocating member disposed relatively independent of said foundation for transfer of articles from one handling unit to another, said reciprocating member being subject to shifting expansion forces generated by ambient temperature changes within the plant and with said forces being of a different order than the first named forces, transfer of said articles between said transfer member and said article handling units being accomplished by close relative dimensional tolerance control of the transfer member and the article handling units, and means to maintain a substantially constant relative dimensional relationship between said foundation and said reciprocating member regardless of environmental temperatures so that the tolerance limits necessary for proper transfer of articles will not be exceeded.

8. The mechanism of claim 7 in which the last named means comprises, means secured to said foundation for sensing when a discrepancy between the relative dimensions of the foundation and the reciprocating member occurs, and means actuated by said sensing means to effect a temperature change of said reciprocating member to reduce said discrepancy and to restore the relative dimensional relationship therebetween to a substantially constant value.

9. The mechanism of claim 7 in which the last named means comprises, a first contact secured to the foundation, a second contact secured to the reciprocating member, said contacts being engaged when said reciprocating member has reached one end of its reciprocating stroke and when an increase in the relative dimensional ratio to the upper tolerance limit has occurred, a third contact secured to the foundation, a fourth contact secured to the reciprocating member, with said third and fourth contacts being engaged when said reciprocating member has reached the other end of its reciprocating stroke and a decrease in the relative dimensional ratio to the lower tolerance limit has occurred, and heating means secured to said reciprocating member and actuated by engagement of a pair of said contacts, said heating means changing the temperature of said reciprocating member to thereby effect a dimensional change therein so that the relative dimensional relationship between said foundation and said reciprocating member is restored to substantially the desired constant.

References Cited in the file of this patent
UNITED STATES PATENTS
2,255,094   Aeppli _____ Sept. 9, 1941